United States Patent
Wardoyo et al.

(10) Patent No.: US 8,753,562 B2
(45) Date of Patent: Jun. 17, 2014

(54) PRODUCTION METHOD OF FINE GRAIN POLYCRYSTALLINE DIAMOND COMPACT

(75) Inventors: Akhmadi Eko Wardoyo, Naka (JP); Itsurou Tajima, Naka (JP)

(73) Assignee: Mitsubishi Materials Corporation, Tokyo (JP)

( * ) Notice: Subject to any disclaimer, the term of this patent is extended or adjusted under 35 U.S.C. 154(b) by 373 days.

(21) Appl. No.: 13/064,470

(22) Filed: Mar. 28, 2011

(65) Prior Publication Data

US 2011/0241266 A1    Oct. 6, 2011

(30) Foreign Application Priority Data

Mar. 31, 2010 (JP) .................................. 2010-080019
Dec. 14, 2010 (JP) .................................. 2010-278017

(51) Int. Cl.
| | | |
|---|---|---|
| *C04B 35/645* | (2006.01) | |
| *C04B 35/52* | (2006.01) | |
| *B82Y 30/00* | (2011.01) | |
| *C04B 35/634* | (2006.01) | |
| *C04B 35/632* | (2006.01) | |

(52) U.S. Cl.
CPC ......... *C04B 35/52* (2013.01); *C04B 2235/3213* (2013.01); *C04B 2235/3206* (2013.01); *C04B 2235/442* (2013.01); *B82Y 30/00* (2013.01); *C04B 35/63436* (2013.01); *C04B 2235/427* (2013.01); *C04B 35/632* (2013.01); *C04B 2235/96* (2013.01); *C04B 35/63408* (2013.01); *C04B 2235/656* (2013.01); *C04B 2235/3208* (2013.01); *C04B 2235/5445* (2013.01); *C04B 2235/5454* (2013.01); *C04B 35/645* (2013.01)
USPC ............................. 264/663; 264/664; 264/603

(58) Field of Classification Search
USPC ........................................ 264/604, 663, 664
See application file for complete search history.

(56) References Cited

U.S. PATENT DOCUMENTS

| | | | | |
|---|---|---|---|---|
| 4,259,090 | A | * | 3/1981 | Bovenkerk ...................... 51/309 |
| 5,128,080 | A | * | 7/1992 | Jurewicz et al. .............. 264/664 |
| 7,556,763 | B2 | * | 7/2009 | Pope et al. .................... 264/602 |
| 7,569,176 | B2 | * | 8/2009 | Pope et al. .................... 264/604 |
| 7,678,325 | B2 | * | 3/2010 | Gardinier ....................... 264/604 |
| 8,309,050 | B2 | * | 11/2012 | Keshavan et al. ............. 423/446 |
| 8,342,269 | B1 | * | 1/2013 | Bertagnolli et al. .......... 175/434 |
| 2005/0087915 | A1 | * | 4/2005 | Pope et al. .................... 264/604 |
| 2007/0009374 | A1 | * | 1/2007 | Akaishi et al. .................. 419/48 |
| 2008/0020243 | A1 | * | 1/2008 | Mori et al. .................. 428/836.1 |
| 2009/0295046 | A1 | * | 12/2009 | Gotoh et al. .................. 264/663 |
| 2011/0023375 | A1 | * | 2/2011 | Sani et al. ....................... 51/297 |
| 2011/0192093 | A1 | * | 8/2011 | Wardoyo et al. ............... 51/298 |
| 2013/0043078 | A1 | * | 2/2013 | Qian et al. .................... 175/428 |
| 2013/0048388 | A1 | * | 2/2013 | Griffo et al. .................. 175/428 |
| 2013/0084474 | A1 | * | 4/2013 | Mills ................................ 429/9 |

FOREIGN PATENT DOCUMENTS

| | | | |
|---|---|---|---|
| JP | 3550587 | B2 | 7/2002 |
| JP | 4014415 | B2 | 8/2003 |
| JP | 2007-070148 | * | 3/2007 |

OTHER PUBLICATIONS

Minoru Akaishi, Shinobu Yamaoka, Physical and chemical properties of the heat resistant diamond compacts from diamond-magnesium carbonate system, Materials Science and Engineering: A, vol. 209, Issues 1-2, May 1996, pp. 54-59.*

Minoru Akaishi, Shinobu Yamaoka, Fumihiro Ueda, Tadakazu Ohashi, Synthesis of polycrystalline diamond compact with magnesium carbonate and its physical properties, Diamond and Related Materials, vol. 5, Issue 1, Jan. 1996, pp. 2-7.*

Hong, S.-M. Akaishi, M. and Yamaoka, S. (1999), High-Pressure Synthesis of Heat-Resistant Diamond Composite Using a Diamond-TiC0.6 Powder Mixture. Journal of the American Ceramic Society, 82: 2497-2501.*

* cited by examiner

*Primary Examiner* — Joseph S Del Sole
*Assistant Examiner* — Russell Kemmerle, III
(74) *Attorney, Agent, or Firm* — Edwards Wildman Palmer LLP; James E. Armstrong, IV

(57) ABSTRACT

[Problem]
This invention aims to provide a production method of a fine grain polycrystalline diamond compact which is suitable for finishing cutting tool materials and/or ultra-precision machining tool materials. In the method, a freeze-drying process for preventing the growth of secondary particle formation is unnecessary, and an aid does not need to be mixed in advance.

[Means for Resolution]
Disclosed is a following production method of a fine grain polycrystalline diamond compact. Each of carbonate and a C—H based organic compound which is a solid at room temperature, is sandwiched between diamond powder layers to stack them up in layers in a Ta capsule. Particle size of the diamond powder is 4 µm or less in average; and the organic compound is preferably one or more selected from among polyethylene, polypropylene and polystyrene. The layers in the capsule are sintered under the conditions of a pressure of 7.7 GPa or higher and a temperature of 2000° C. or higher.

In the method, diamond powder as a raw material for sintering is prepared without any freeze-drying process; also the pre-mixture of an aid and an oxalic acid dihydrate which is a hazardous material, is not required.

12 Claims, 1 Drawing Sheet

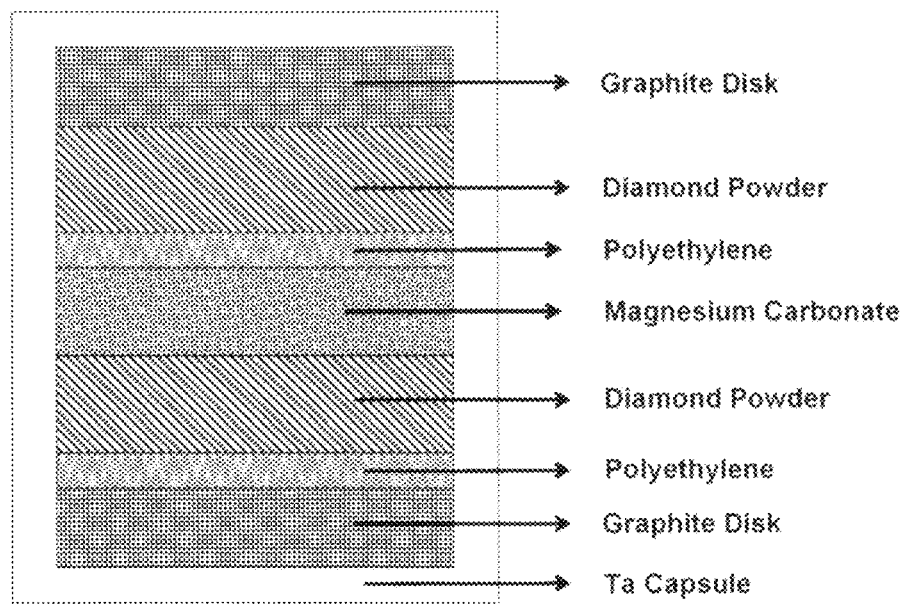

PRODUCTION METHOD OF FINE GRAIN POLYCRYSTALLINE DIAMOND COMPACT

TECHNICAL FIELD

The invention relates to a production method of a fine grain polycrystalline diamond compact. In this method, diamond powder as a raw material for sintering is prepared without any freeze-drying processes; also the pre-mixture of an aid and an oxalic acid dihydrate which is a hazardous material is not required.

BACKGROUND ART

Diamonds have inherent characteristics, such as non-conductivity, great hardness, high thermal conductivity, high heat resistance, and excellent chemical stability. Using these characteristics, diamonds have been applied to various fields, such as electronic devices and sensor materials, materials related to biotechnology, materials related to optics, and wear-resistant materials. A diamond compact is applied to, for example, a finishing cutting tool, an ultra-precision machining tool or the like by taking advantage of the hardness and wear resistance or the like; then such tools can be expected to have excellent cutting performance.

Then, as a production method of such a diamond compact, Patent Document 1, for example, shows a method of producing a diamond compact. In the method proposed by the document,
a mixture of carbonates and of organic compounds which form a supercritical fluid phase is used as a sintering aid;
the mixture is stacked up between the diamond layers; and then
the stacked layers are sintered under the conditions of high pressure and high temperature of 2000° C. or higher.
Under such conditions, the diamond is thermodynamically stable.

In this production method, for example, oxalic acid dihydrate is used as an organic compound to form the above-mentioned supercritical fluid phase. However, oxalic acid dihydrate is a hazardous material, and needs to be mixed with carbonate in advance in order to prepare the sintering aid. Therefore, handling them is difficult, and this difficulty has been the obstacle to the attempt to use this method practically.

Patent Document 2, for example, also shows another production method. In order to remove silicate from the natural diamond powder during the final process of the method, the document proposes the steps in which:
an aqueous solution of pH 3 to 5 containing the diamond powder in a dispersed state, is poured into a vessel, and is shaken with quick movements; then,
the aqueous solution into which the diamond powder has been dispersed is frozen in the vessel using liquid nitrogen; further,
the diamond powder prepared by such a freeze-drying process is sintered together with the sintering aid of carbonate mixed with organic compounds (oxalic acid dihydrate), at a temperature of 1700° C. or higher, using an ultra high pressure/high temperature apparatus.

In this production method, the secondary particle formation in the diamond powder as a raw material for sintering can be considerably reduced. Thus, a relatively homogeneous diamond compact can be obtained. However, since this production method also requires the freeze-drying process, the preliminary arrangements become complicated. Additionally, the problem of the organic compound (oxalic acid dihydrate) being used as a sintering aid which has to be mixed in advance, persists.

RELATED ART DOCUMENTS

Patent Documents

[Patent Document 1] Specification of Japanese Patent No. 3550587
[Patent Document 2] Specification of Japanese Patent No. 4014415

THE OUTLINE OF INVENTION

Problem that the Invention is to Solve

This invention aims to provide a production method of a fine grain polycrystalline diamond compact which is suitable for finishing cutting tool materials and/or ultra-precision machining tool materials, for example. Further, in the production method,
a freeze-drying process for preventing the growth of secondary particle formation, is unnecessary;
the organic compound (oxalic acid dihydrate) which is a hazardous material is not used; and
a sintering aid does not need to be mixed in advance.

Means for Solving the Problem

In order to solve the aforementioned problems, the inventors of this invention conducted intensive research on sintering aids used for production of a diamond compact; discovered the following knowledge.

For example, in order to produce the diamond compact with such a conventional production method as disclosed in Patent Document 2,
the sintering aid including the mixture of the carbonate (for example, magnesium carbonate, calcium carbonate or the like) and the organic compound (oxalic acid dihydrate) for forming a supercritical fluid phase, is prepared beforehand;
the materials are a graphite disk (a disk made of graphite), Ta foil, diamond powder, powdered mixture of carbonate and organic compound, diamond powder, Ta foil, diamond powder, and powdered mixture of carbonate and organic compound;
the above materials are stacked up in this order on the bottom of a Ta capsule, namely, a capsule made of Ta; and then
the above prepared materials in the Ta capsule are sintered in an ultra high pressure/high temperature apparatus.

The inventors of this invention examined carefully the sintering aids to be used for producing the diamond compact; and found that:
instead of the oxalic acid which has been used conventionally, use of a C—H based organic compound which is a solid at room temperature, enables producing the sintered compact, even when the diamond powder having an average particle diameter of 4 μm or less is used as the raw powder material for the sintered compact. The inventors also found that:
in order to secure safety in production, the use of a hazardous material can be avoided; and
an improvement in working efficiency can be carried out, since the preparation of the sintering aid required to be mixed with carbonate in advance is unnecessary.

To put it concretely, one or more of polyethylene, polypropylene and polystyrene is/are suitable for the room temperature solid C—H based organic compound, namely, the C—H based organic compound which is a solid at room temperature. While sintering the diamond, such C—H based organic compound
becomes a supercritical fluid phase,
makes the surface of the diamond particle clean, and then decomposes secondary particles of the diamond powder.
In such a situation,
the carbonate is easily infiltrated into the diamond particles;
such carbonate and the infiltrated C—H based organic compound efficiently dissolve a part of the diamond particle;
diamond is extracted from the molten carbonate which is completely saturated with carbon; and then
a direct bonding is formed between the diamond particles.
Thus, the knowledge that it is possible to sinter the fine grain polycrystalline diamond compact without forming secondary particles, results from the above facts.

The invention is based on the aforementioned knowledge, and has the features detailed in the following (1) and (2).
(1) A production method of a fine grain polycrystalline diamond compact wherein
each of carbonate and a catalyst is sandwiched between diamond powder layers in order to form a stack of them;
particle size of the diamond powder is 4 μm or less in average;
the catalyst
comprises a room temperature solid C—H based organic compound, and
has a weight ratio of 1/5000 to 1/1000 in relation to the diamond powder; and
the layers are sintered under the conditions of a pressure of 7.7 GPa or higher and a temperature of 2000° C. or higher.
(2) A production method of a fine grain crystalline diamond compact according to (1), wherein
the room temperature solid C—H based organic compound is
one or more selected from among polyethylene, polypropylene and polystyrene.

Next, the embodiments of the invention will be explained more specifically and in detail.

FIG. 1 is a schematic cross-sectional diagram showing a configuration of the production method of the fine grain polycrystalline diamond compact of the present invention, in which
diamond powder,
magnesium carbonate (carbonate), and
polyethylene (a C—H based organic compound in a solid state at room temperature)
are layered upon each other in a Ta capsule.
In this case, a magnesium carbonate is used as a carbonate; and a polyethylene is used as the room temperature solid C—H based organic compound.
FIG. 1 shows a schematic diagram in which:
 a graphite disk (1 mm in thickness),
 polyethylene (0.2 mg),
 diamond powder of 4 μm or less in average grain diameter (0.45 g),
 magnesium carbonate (0.2 g),
 polyethylene (0.2 mg),
 diamond powder of 4 μm or less in average grain diameter (0.45 g), and
 a graphite disk (1 mm in thickness),
are layered in this order from the bottom of the Ta capsule to the top of it.
In the present invention, to produce the fine grain polycrystalline diamond compact,
the raw materials for sintering in such layers configured in the Ta capsule are sintered under the conditions in which diamond is stable, that is,
a sintering pressure is 7.7 GPa or higher and
a sintering temperature is 2000° C. or higher.

Diamond Powder:
A diamond powder produced by a method well-known at present, not limited to the vapor phase synthesis method, is usable as the sintering powder material. The size of the diamond powder is set at an average particle diameter of 4 μm or less in the invention. In a case where the average particle size of the diamond powder is larger than 4 μm, i.e. the diamond powder is a rough particle; it is possible to sinter such diamond powder with only the carbonate as the sintering aid without using the oxalic acid dihydrate. Therefore, the average particle diameter of the diamond powder as the raw material for the sintered compact is set to 4 μm or less in the invention.

Sintering Aid:
As the carbonate, for example, magnesium carbonate and/or calcium carbonate which have been used as the conventional carbonate, are also usable in the invention.
In conventional methods, for example, a sintering aid which is a mixture of the carbonate and the oxalic acid dihydrate for forming the supercritical fluid phase, is prepared in advance; and then the sintering aid is required to be interposed between the diamond layers. On the other hand, in the invention, since the raw powder materials are stacked up in a Ta capsule to form the stack as shown in FIG. 1, it becomes unnecessary to mix in advance the carbonate (for example, magnesium carbonate) and the room temperature solid C—H based organic compound (for example, polyethylene). By sandwiching each layer between the diamond layers, each layer is just stacked up independently.

Polyethylene, polypropylene and/or polystyrene are suitable for the room temperature solid C—H based organic compound which is used in the invention. In case of using other organic compounds except C—H based organic compounds, for example, using polyvinyl chloride; chlorine [Cl] prevents diamond particles from being directly bonded to each other. Also, in the case of using polytetrafluoroethylene, fluorine [F] prevents diamond particles from being directly bonded to each other. Therefore, the usage of organic compounds except C—H based organic compounds, should be avoided. Further, the quantity of the room temperature solid C—H based organic compound which is required to be used in the present invention, is shown as the following equation by a weight ratio.
(Quantity of the room temperature solid C—H based organic compound)/(Weight of diamond powder) should be within a range of 1/5000 to 1/1000 wt-%.
When the quantity of the room temperature solid C—H based organic compound is small, i.e. the weight ratio is smaller than this range (in the case where the above weight ratio is less than 1/5000) the cleaning effect on the surface of the diamond particles in the diamond layer is small. Moreover, the infiltration into the diamond layers becomes insufficient, and the dissolving effect on the secondary particles also becomes small. And then, the direct bonding between the diamond particles becomes insufficiently developed.

On the other hand, when the quantity of the room temperature solid C—H based organic compound increases, and then the above weight ratio becomes more than 1/1000; the strength and hardness of the diamond compact, as well as its heat resistance, will decline. Therefore, the ratio of quantity (weight) of the room temperature solid C—H based organic compound to the weight of diamond powder has to be within a range of 1/5000 to 1/1000 wt-%.

Sintering in an Ultra High Pressure/High Temperature Apparatus:
In the invention, after stacking up the raw powder materials in the Ta capsule to make them a configuration in layers as shown in FIG. 1, they are sintered under the conditions in which diamond is stable, that is, a sintering pressure is 7.7 GPa or higher, and a sintering temperature is 2000° C. or higher.

The sintering process under such conditions for 10 to 30 minutes can synthesize the fine grain polycrystalline diamond compact with good reproducibility.

If the sintering pressure is less than 7.7 GPa, since diamond is not stable under such pressure, the sintering process under such pressure cannot be carried out well. On the other hand, if the pressure is higher than 8 GPa, the productivity of the sintering process under such pressure is low, and also the size of the apparatus must increase. Therefore a sintering pressure in the range of 7.7 to 8 GPa is preferable.

Further, if the sintering temperature is at less than 2000° C., since the carbonate infiltrates insufficiently into the diamond layers at such temperature, the sintering process at such temperature cannot be carried out well. On the other hand, if the sintering temperature is higher than 2500° C., the diamond is undesirably transformed into graphite. Therefore, a sintering temperature in the range of 2000° to 2500° C. is preferable.

Advantage of the Invention

The present invention, the production method of the fine grain polycrystalline diamond compact, has advantages wherein:

fine grain diamond powder with an average particle size of 4 μm or less (for instance, natural diamond powder) is usable as a raw material for sintering;

since the above diamond powder as the raw material for sintering can be prepared without any freeze-drying processes, the required steps to prepare the raw material can be reduced;

since the room temperature solid C—H based organic compound (for example, a commercially-available sheet of polyethylene) which is not a hazardous material, is used as a organic compound, safety in production is secured, and also the environmental impact can be reduced; and since the preparation of the sintering aid required to be mixed in advance is unnecessary, improvement of working efficiency can be expected.

BRIEF DESCRIPTION OF THE DRAWINGS

FIG. 1

A schematic cross-sectional diagram shows a configuration of the production method of the invention, in which diamond powder, magnesium carbonate (carbonate), and polyethylene (a C—H based organic compound in a solid state at room temperature)

are in layers with each other in a Ta capsule.

MODES FOR CARRYING OUT THE INVENTION

With reference to the embodiments which follow, the present invention will be explained.

Embodiments

Natural diamond powder of 4 μm or less in average particle diameter was used as the diamond powder which is the raw material for the sintered compact.

Since the natural diamond powder contains a large amount of silicate a silicate removal treatment in which the silicate is removed from the natural diamond powder, was carried out beforehand in molten NaOH with a Zr crucible. Further, the diamond powder was treated with a solution of thermal aqua regia; this treatment removed Zr. Such Zr was an impurity in the diamond powder derived from the crucible.

Next, each of the diamond powder, the carbonate, and the room temperature solid C-H based organic compound was prepared to have each ratio corresponding to inventions 1 through 6 shown in Table 1 (hereinafter, the inventions 1 through 6 mean the fine grain polycrystalline diamond compacts of the invention). Also, each of them was packed in the Ta capsule to form a structure in layers as shown in FIG. 1. Further, each Ta capsule corresponding to the inventions 1 through 6 was placed in a conventional belt-type ultra high pressure/high temperature apparatus. And then the above prepared materials in each Ta capsule were sintered under each sintering condition, namely, pressure and temperature, corresponding to the inventions 1 through 6 shown in FIG. 2, to produce each fine grain polycrystalline diamond compact of the invention.

Then, the hardness of each of the above inventions 1 through 6 was measured, and also the heat resistance of each was tested. Further, XRD (X-ray) analysis was conducted for checking whether there was graphitization (the formation of graphite from diamond) after heat treatment, and for checking whether any internal cracks were in the sintered compacts.

In addition, the above measurement of hardness was taken with a Vickers' hardness measurement apparatus. Also, in order to perform the heat resistance test, the samples were heated in a vacuum furnace at a temperature of 1200° C. for 30 minutes. The results of the above measurements and tests are shown in Table 2.

In order to compare the inventions 1 through 6, comparative example diamond compacts were produced from the same diamond powder used for producing the raw material for sintering. Each of the diamond powder, the carbonate, and the room temperature solid C—H based organic compound was prepared to have each ratio corresponding to comparative examples 1 through 4 shown in Table 1 (hereinafter, the comparative examples 1 through 4 mean the comparative example diamond compacts). Also, each of them was packed in the Ta capsule to form a structure in layers as shown in FIG. 1. Further, each Ta capsule corresponding to the comparative examples 1 through 4 was placed in a conventional belt-type ultra high pressure/high temperature apparatus. And then the above prepared materials in each Ta capsule were sintered under each sintering condition, namely, pressure and temperature, corresponding to the comparative examples 1 through 4 shown in FIG. 2, to produce each comparative example diamond compact.

Then, as in the above inventions 1 through 6, the hardness of each of the comparative examples 1 through 4 was measured, and also the heat resistance of each was tested. Further, the same analysis was conducted for checking whether there was graphitization (the formation of graphite from diamond) after heat treatment, and for checking whether any internal cracks were in the sintered compacts. The results of the measurements and tests are shown in Table 2.

Moreover, for reference to the inventions 1 through 6, the reference example diamond compacts were produced from the same diamond powder used for producing the raw material for sintering. Each of the diamond powder, the carbonate, and polyvinyl chloride or polyfluoroethylene was prepared to have each ratio corresponding to reference examples 1 and 2 shown in Table 3 (hereinafter, the reference examples 1 and 2 mean the reference example diamond compacts). Each of them was packed in the Ta capsule to form a structure in layers as shown in FIG. 1. Further, each Ta capsule corresponding to the reference examples 1 and 2 was also placed in a conventional belt-type ultra high pressure/high temperature apparatus. And then the above prepared materials in each Ta capsule were sintered under each sintering condition, namely, pressure and temperature, corresponding to the reference examples 1 and 2 shown in FIG. 2, to produce each reference example diamond compact.

Then, as in the above inventions 1 through 6, the hardness of each of the reference examples 1 and 2 was measured, and also the heat resistance of each was tested. Further, the same analysis was conducted for checking whether there was graphitization (the formation of graphite from diamond) after heat treatment, and for checking whether any internal cracks were in the sintered compacts. The results of the measurements and tests are shown in Table 4.

TABLE 1

| Powder materials type | Quantity of diamond powder [g] | Carbonate powder Type | Quantity [g] | Room temperature solid C—H based organic material Type | Quantity [mg] |
|---|---|---|---|---|---|
| Invention 1 | 0.45 | MgCO$_3$ | 0.2 | Polyethylene | 0.2 |
| Invention 2 | 0.45 | CaCO$_3$ | 0.2 | Polyethylene | 0.2 |
| Invention 3 | 0.45 | SrCO$_3$ | 0.2 | Polyethylene | 0.2 |
| Invention 4 | 0.45 | CaCO$_3$ | 0.2 | Polypropylene | 0.2 |
| Invention 5 | 0.45 | MgCO$_3$ | 0.2 | Polystyrene | 0.2 |
| Invention 6 | 0.45 | MgCO$_3$ | 0.2 | Polystyrene | 0.2 |
| Comparative example 1 | 0.45 | MgCO$_3$ | 0.2 | Polyethylene | 0.6* |
| Comparative example 2 | 0.45 | MgCO$_3$ | 0.2 | Polypropylene | 0.05* |
| Comparative example 3 | 0.45 | SrCO$_3$ | 0.2 | Polypropylene | 0.2 |
| Comparative example 4 | 0.45 | MgCO$_3$ | 0.2 | Polystyrene | 0.2 |

Note:
symbol '*' means that the values are outside the range provided by the present invention.

TABLE 2

| Sintered compact type | Sintering condition Temperature [° C.] | Pressure [GPa] | Characteristics of each sintered compact Hardness [Hv] | Graphitization | Internal crack |
|---|---|---|---|---|---|
| Invention 1 | 2100 | 7.7 | 70 Gpa | None | None |
| Invention 2 | 2200 | 8.0 | 70 Gpa | None | None |
| Invention 3 | 2300 | 8.0 | 70 Gpa | None | None |
| Invention 4 | 2200 | 7.7 | 70 Gpa | None | None |
| Invention 5 | 2300 | 7.7 | 70 Gpa | None | None |
| Invention 6 | 2100 | 7.7 | 70 Gpa | None | None |
| Comparative example 1 | 2300 | 7.7 | Difficult to measure | None | Occurred |
| Comparative example 2 | 2100 | 7.7 | Difficult to measure | None | Occurred |
| Comparative example 3 | 2300 | 6.5* | Difficult to measure | Occurred | Occurred |
| Comparative example 4 | 2800 | 6.5* | Difficult to measure | Occurred | Occurred |

Note:
symbol '*' means that the values are outside the range provided by the present invention.

TABLE 3

| Powder materials type | Quantity of diamond powder [g] | Carbonate powder Type | Quantity [g] | Non-C—H based organic material Type | Quantity [mg] |
|---|---|---|---|---|---|
| Reference example 1 | 0.45 | MgCO$_3$ | 0.2 | Polyvinyl chloride | 0.2 |
| Reference example 2 | 0.45 | CaCO$_3$ | 0.2 | Polyfluoroethylene | 0.2 |

TABLE 4

| Sintered compact type | Sintering condition Temperature [° C.] | Pressure [GPa] | Characteristics of each sintered compact Hardness [Hv] | Graphitization | Internal crack |
|---|---|---|---|---|---|
| Reference example 1 | 2200 | 7.7 | Difficult to measure | None | Occurred |
| Reference example 2 | 2100 | 7.7 | Difficult to measure | None | Occurred |

On comparison of the various characteristics shown in Table 2 and/or Table 4, it becomes clear that the inventions 1 through 6 have great hardness;

no graphite can be synthesized in them during the heat resistance test; and no internal cracks are found in the sintered compacts.

Therefore, it can be found that the inventions 1 through 6 have a robust sintered compact structure, and are fine grain polycrystalline diamond compacts which have an excellent heat resistance property.

On the other hand, concerning the comparative examples 1 and 2, the quantities of the room temperature solid C—H based organic compounds used in them are outside the range provided by the present invention. Thus, such quantities cause the occurrence of the internal cracks in these sintered compacts. Further, while measuring their hardness, peeling occurs around the indentation formed by this measurement. Therefore, measurement of their hardness was difficult to make, and could not be made accurately.

Moreover, concerning the comparative examples 3 and 4, their sintering conditions are outside the range provided by the present invention. Thus, such conditions cause the occurrence of internal cracks as well as graphitization in these sintered compacts: and then their hardness could not be measured accurately for the same reason as in the above comparative examples 1 and 2.

Moreover, concerning the reference examples 1 and 2, elements except C—H (chlorine [Cl] or the like) remain between the diamond particles. Such elements prevent diamond particles from being directly bonded to each other. Thus, sintered compacts with great hardness could not be obtained. Also, heat treatment made cracks immediately occur in them. Further, while measuring their hardness, peeling occurs around the indentation formed by this measurement; and then measurement of their hardness was difficult to make, and could not be made accurately as in the above comparative examples 1 through 4.

As described above, the production method of the invention has features wherein:

fine grain diamond powder with an average particle size of 4 μm or less is usable as a raw material for sintering;

no freeze-drying process is necessary for the above diamond powder;

the room temperature solid C—H based organic compound which is not a hazardous material, is usable as an organic compound; and preparation of a sintering aid required to be mixed in advance is unnecessary.

Thus, the fine grain polycrystalline diamond compact with a robust sintered compact structure and an excellent heat resistance property, can be obtained by such simplified production processes.

INDUSTRIAL APPLICABILITY

According to the production method of the fine grain polycrystalline diamond compact in this invention, the effect in terms of practical applicability may be extremely large and application in a wide range of technical areas can be expected from the viewpoints of the decrease in production steps, securing safety, reduction of the environmental impact and improvement in working efficiency.

The invention claimed is:

1. A production method of a fine grain polycrystalline diamond compact comprising:

layering upon each other a diamond powder, a carbonate, a catalyst, and another diamond powder, in this order, to form a stack of layers;

particle size of the diamond powder being 4 μm or less in average grain diameter;

the catalyst comprising a C—H based organic compound which is a solid at room temperature, and has a weight ratio of 1/5000 to 1/1000 in relation to the diamond powder; and sintering the layers under the conditions of a pressure of 7.7 GPa or higher and a temperature of 2000° C. or higher.

2. The production method of a fine grain polycrystalline diamond compact according to claim 1, wherein the C—H based organic compound which is a solid at room temperature, is one or more selected from among polyethylene, polypropylene and polystyrene.

3. The production method of a fine grain polycrystalline diamond compact according to claim 2, wherein the carbonate is a magnesium carbonate.

4. The production method of a fine grain polycrystalline diamond compact according to claim 1, wherein the C—H based organic compound is a polyethylene.

5. The production method of a fine grain polycrystalline diamond compact according to claim 4, wherein the carbonate is a magnesium carbonate.

6. The production method of a fine grain polycrystalline diamond compact according to claim 1, wherein the carbonate is a magnesium carbonate.

7. The production method of a fine grain polycrystalline diamond compact according to claim 1, wherein the layers are sintered at a pressure of 8 GPa or lower.

8. The production method of a fine grain polycrystalline diamond compact according to claim 1, wherein the layers are sintered at a temperature of 2500° C. or lower.

9. The production method of a fine grain polycrystalline diamond compact according to claim 1, wherein the layers are sintered such that no graphitization occurs.

10. The production method of a fine grain polycrystalline diamond compact according to claim 1, wherein the layers are sintered such that there are no internal cracks in the formed sintered compacts.

11. The production method of a fine grain polycrystalline diamond compact according to claim 1, wherein the layers are sintered such that a fine grain polycrystalline diamond compact is formed.

12. The production method of a fine grain polycrystalline diamond compact according to claim 1, wherein the layers are sintered for 10 to 30 minutes.

* * * * *